United States Patent
Yang et al.

(10) Patent No.: US 10,142,914 B2
(45) Date of Patent: Nov. 27, 2018

(54) SIGNAL TRANSMISSION METHOD FOR MTC AND APPARATUS FOR SAME

(71) Applicant: LG ELECTRONICS INC., Seoul (KR)

(72) Inventors: Suckchel Yang, Seoul (KR); Yunjung Yi, Seoul (KR); Hyangsun You, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/904,937

(22) PCT Filed: Jul. 16, 2014

(86) PCT No.: PCT/KR2014/006455
§ 371 (c)(1),
(2) Date: Jan. 13, 2016

(87) PCT Pub. No.: WO2015/009063
PCT Pub. Date: Jan. 22, 2015

(65) Prior Publication Data
US 2016/0150462 A1    May 26, 2016

Related U.S. Application Data

(60) Provisional application No. 61/846,634, filed on Jul. 16, 2013, provisional application No. 61/886,680, (Continued)

(51) Int. Cl.
*H04W 4/00* (2018.01)
*H04W 48/08* (2009.01)
(Continued)

(52) U.S. Cl.
CPC ............ *H04W 48/08* (2013.01); *H04W 4/70* (2018.02); *H04W 74/0833* (2013.01); *H04W 48/02* (2013.01)

(58) Field of Classification Search
CPC ..... H04W 4/005; H04W 28/18; H04W 48/08; H04W 40/24; H04W 48/16; H04W 24/02; H04W 48/02; H04W 74/0803
See application file for complete search history.

(56) References Cited

U.S. PATENT DOCUMENTS

| 2014/0126508 A1* | 5/2014 | Young | H04W 4/005 370/329 |
| 2015/0230249 A1* | 8/2015 | Nguyen | H04W 4/005 370/329 |
| 2015/0327301 A1* | 11/2015 | Fong | H04W 28/02 370/312 |

FOREIGN PATENT DOCUMENTS

| JP | 2014533898 | 12/2014 |
| KR | 10-2012-0127643 | 11/2012 |

(Continued)

OTHER PUBLICATIONS

PCT International Application No. PCT/KR2014/006455, Written Opinion of the International Searching Authority dated Sep. 30, 2014, 14 pages.

(Continued)

*Primary Examiner* — Noel R Beharry
*Assistant Examiner* — Lionel Preval
(74) *Attorney, Agent, or Firm* — Lee Hong Degerman Kang Waimey

(57) ABSTRACT

The present invention relates to a wireless communication system. Specifically, the present invention relates to a method and an apparatus for controlling network connection of a terminal in a wireless communication system, the invention relating to a method for controlling network for (Continued)

same, wherein the method comprises the steps of: receiving system information comprising control information for adjusting a network connection work connection on the base station, based on the control information, wherein, when the control information allows the network connection or when the terminal is a non-LC UE type, a random connection process is performed in the process for the network connection, and when the control information does not allow the network connection and the terminal is an LC UE type, the random connection process is skipped in the process for the network connection.

8 Claims, 10 Drawing Sheets

Related U.S. Application Data filed on Oct. 4, 2013, provisional application No. 61/947,430, filed on Mar. 4, 2014, provisional application No. 61/950,825, filed on Mar. 10, 2014, provisional application No. 61/952,848, filed on Mar. 13, 2014, provisional application No. 61/954,576, filed on Mar. 17, 2014, provisional application No. 61/969,809, filed on Mar. 24, 2014.

(51) Int. Cl.
*H04W 4/70* (2018.01)
*H04W 74/08* (2009.01)
*H04W 48/02* (2009.01)

(56) References Cited

FOREIGN PATENT DOCUMENTS

| KR | 10-2012-0130223 | 11/2012 |
|---|---|---|
| KR | 10-2013-0016315 | 2/2013 |
| KR | 10-2013-0058692 | 6/2013 |
| KR | 10-2013-0063650 | 6/2013 |
| WO | 2012093583 | 7/2012 |
| WO | 2012137402 | 10/2012 |
| WO | 2013022474 | 2/2013 |
| WO | 2013077235 | 5/2013 |

OTHER PUBLICATIONS

Vodafone, "New WI: Low cost & enhanced coverage MTC UE for LTE", RP-130848, 3GPP TSG RAN Meeting #60, Jun. 2013, 7 pages.
Catt, "Discussion on new UE category/type for low cost MTC UE for LTE", R1-133017, 3GPP TSG RAN WG1 Meeting #74, Aug. 2013, 3 pages.

* cited by examiner

\* If control information allows network access or UE is non-MTC UE, random access procedure for network access may be performed.
\* If control information does not allow network access and UE is MTC UE, random access procedure for network access may be skipped or delayed by predetermined time

SIGNAL TRANSMISSION METHOD FOR MTC AND APPARATUS FOR SAME

CROSS-REFERENCE TO RELATED APPLICATIONS

This application is the National Stage filing under 35 U.S.C. 371 of International Application No. PCT/KR2014/006455, filed on Jul. 16, 2014, which claims the benefit of U.S. Provisional Application Nos. 61/846,634, filed on Jul. 16, 2013, 61/886,680, filed on Oct. 4, 2013, 61/947,430, filed on Mar. 4, 2014, 61/950,825, filed on Mar. 10, 2014, 61/952,848, filed on Mar. 13, 2014, 61/954,576, filed on Mar. 17, 2014, and 61/969,809, filed on Mar. 24, 2014, the contents of which are all hereby incorporated by reference herein in their entirety.

TECHNICAL FIELD

The present invention relates to a method and apparatus for transmitting a signal in a wireless communication system and, more particularly, to a method and apparatus for transmitting a signal and a method and apparatus for signaling, for Machine Type Communication (MTC).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE

Technical Problem

An object of the present invention devised to solve the conventional problem is to provide a method and apparatus for transmitting/processing a signal and a method and apparatus for signaling, for Machine Type Communication (MTC).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for controlling network access by a User Equipment (UE) in a wireless communication system includes receiving from a Base Station (BS) system information including control information for controlling network access of a Machine Type Communication (MTC) device, and performing a procedure for network access to the BS based on the control information. If the control information allows network access or the UE is a non-Low Capability (LC) UE type, a random access procedure is performed in the network access procedure, and if the control information does not allow network access and the UE is an LC UE type, a random access procedure is skipped in the network access procedure.

In another aspect of the present invention, a UE in a wireless communication system includes a Radio Frequency (RF) unit, and a processor. The processor is configured to receive from a BS system information including control information for controlling network access of an MTC device, and perform a procedure for network access to the BS based on the control information. If the control information allows network access or the UE is a non-LC UE type, a random access procedure is performed in the network access procedure, and if the control information does not allow network access and the UE is an LC UE type, a random access procedure is skipped in the network access procedure.

The control information may indicate whether network access of an MTC device is allowed or not.

The control information may include information for reducing or omitting network access of an MTC device.

The control information may include information indicating whether the BS supports an MTC function.

The system information may include a System Information Block (SIB).

The system information may include a Master Information Block (MIB) and the control information may be received in a reserved bit of the MIB.

Advantageous Effects

According to the embodiments of the present invention, signals can be transmitted/processed efficiently in a wireless communication system. Specifically, the embodiments of the present invention can provide a method and apparatus for efficiently transmitting and receiving a signal and a method and apparatus for efficient signaling, for Machine Type Communication (MTC).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
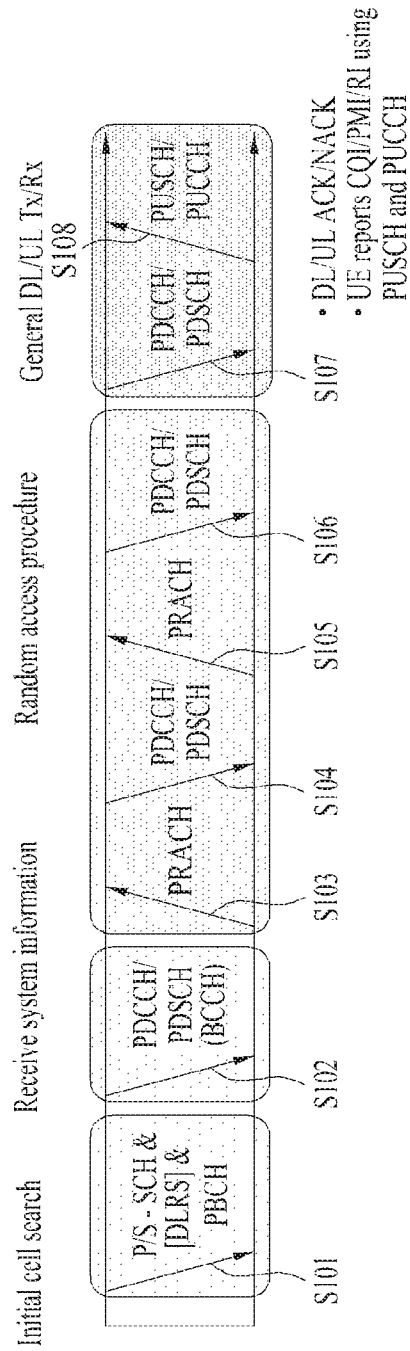
FIG. 1 illustrates physical channels and a general signal transmission method using the physical channels in a Long Term Evolution(-Advanced) (LTE(-A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
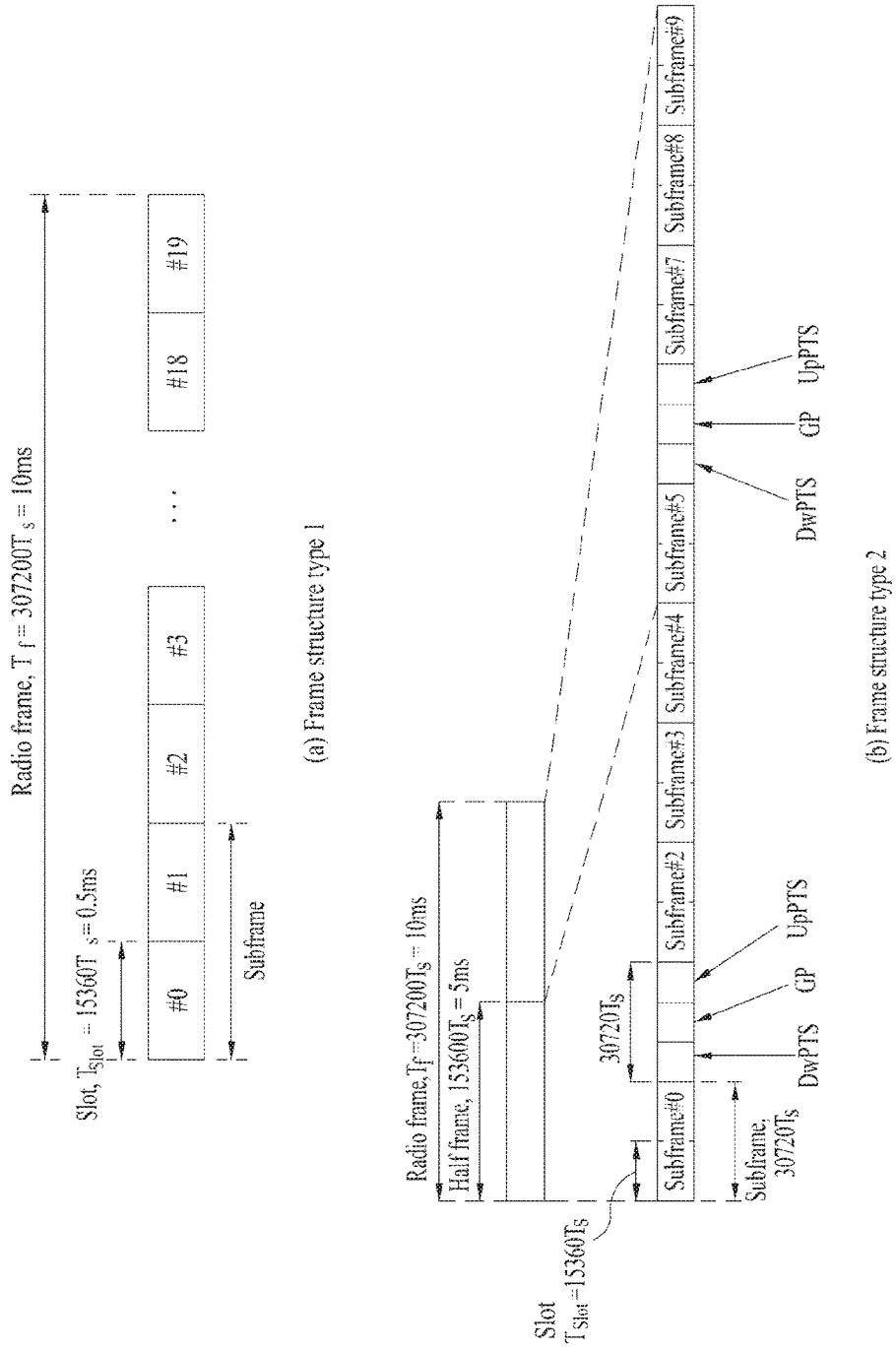
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(*a*) is a diagram illustrating the structure of the type 1 radio frame. An FDD radio frame includes only DL subframes or only UL subframes. The radio frame includes 10 subframes, each subframe including two slots in the time domain. One subframe may be 1ms long and one slot may be 0.5 ms long. One slot includes a plurality of (DL) OFDM symbols or a plurality of (UL) SC-FDMA symbols in the time domain. Unless mentioned otherwise, an OFDM symbol or an SC-FDMA symbol may be simply referred to as a symbol (sym), herein.

FIG. 2(*b*) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

[Table 1] lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents a DL subframe, U represents a UL subframe, and S represents a special subframe.

Figure 3:
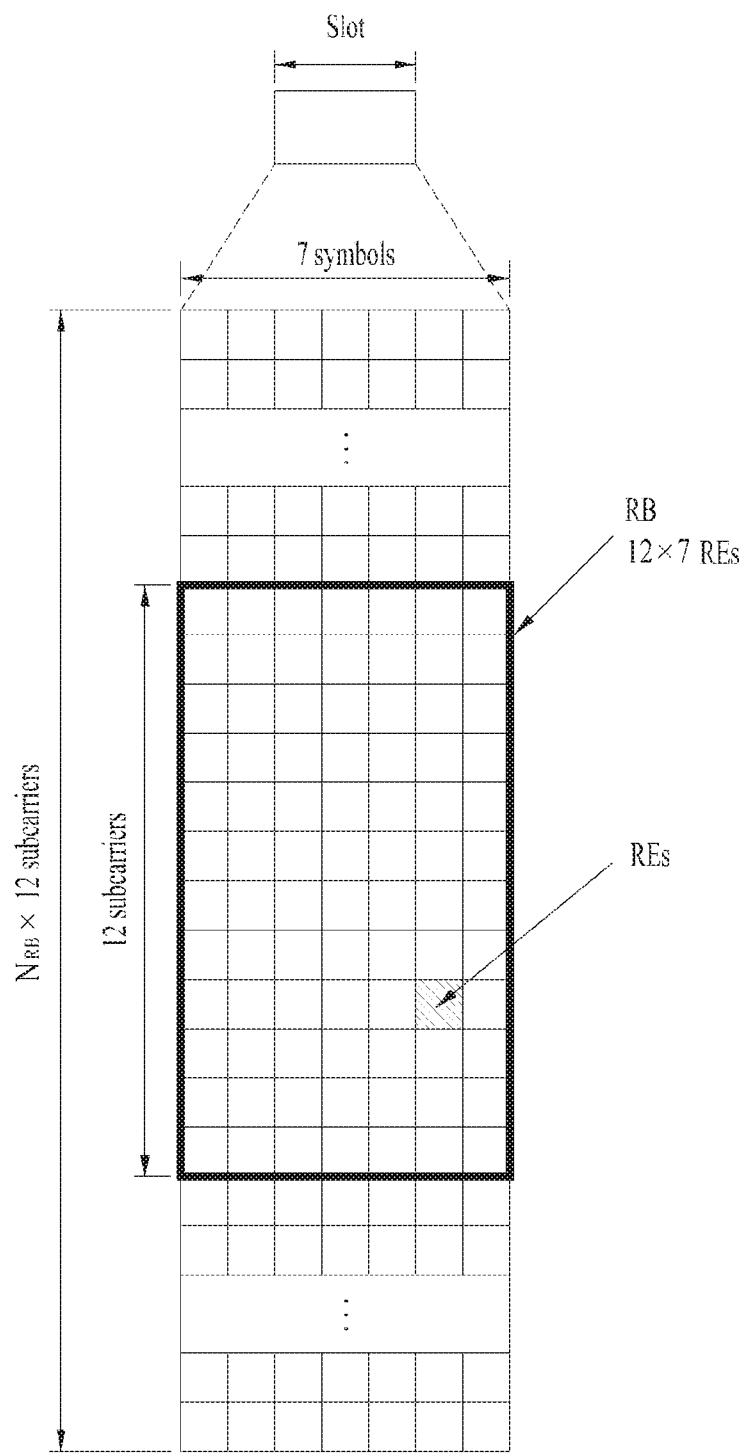
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
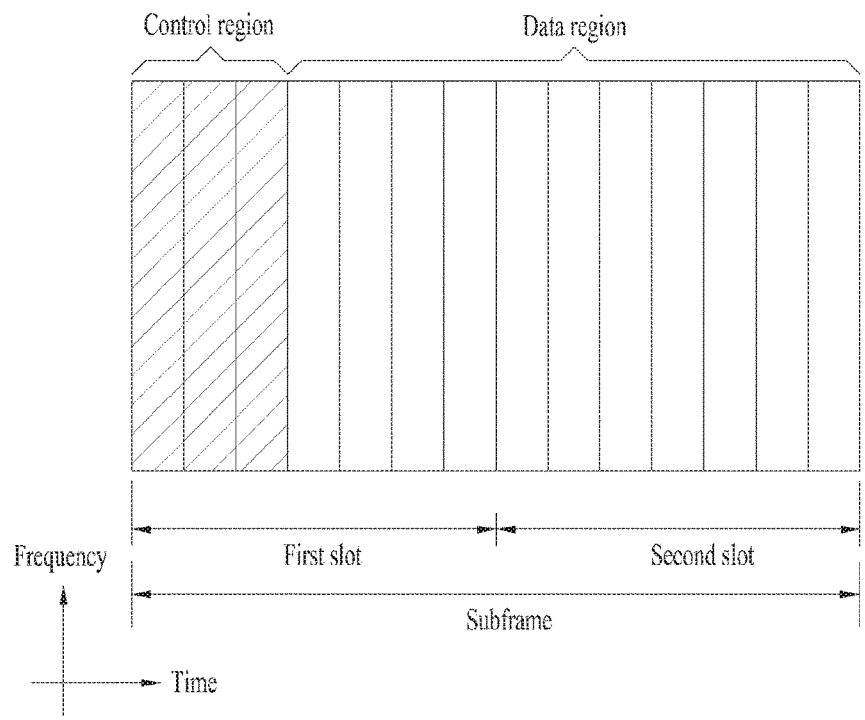
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

[Table 2] lists the number of CCEs, the number of REGs, and the number of PDCCH bits for each PDCCH format.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs may be numbered consecutively and a PDCCH having a format with n CCEs may start only at a CCE with an index being a multiple of n. The number of CCEs used for transmission of a specific PDCCH is determined according to a channel condition by an eNB. For example, if the PDCCH is for a UE having a good DL channel (e.g., a UE near to the eNB), one CCE may be sufficient for the PDCCH. On the other hand, if the PDCCH is for a UE having a poor channel (e.g., a UE near to a cell edge), 8 CCEs may be used for the PDCCH in order to achieve sufficient robustness. In addition, the power level of the PDCCH may be controlled according to the channel condition.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI)) according to the owner or usage of a PDCCH. In other words, the PDCCH is CRC-scrambled with the ID (e.g., the RNTI).

[Table 3] lists exemplary IDs by which a PDCCH is masked.

TABLE 3

| Type | Identifier | Description |
|---|---|---|
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

The LTE(-A) standard defines the CCE positions of a limited set (equivalent to a limited CCE set or a limited PDCCH candidate set) in which a PDCCH may be located, for each UE. The CCE positions of a limited set that a UE should monitor to detect a PDCCH directed to the UE may be referred to as a Search Space (SS). Monitoring includes decoding each PDCCH candidate (blind decoding). A UE-specific Search Space (USS) and a Common Search Space (CSS) are defined. A USS is configured on a UE basis and a CSS is configured commonly for UEs. The USS and the CSS may be overlapped. The starting position of the USS hops between subframes UE-specifically. An SS may have a different size according to a PDCCH format.

[Table 4] lists CSS sizes and USS sizes.

TABLE 4

| PDCCH format | Number of CCEs (n) | Number of PDCCH candidates in CSS | Number of PDCCH candidates in USS |
|---|---|---|---|
| 0 | 1 | — | 6 |
| 1 | 2 | — | 6 |
| 2 | 4 | 4 | 2 |
| 3 | 8 | 2 | 2 |

To place computation load under control according to the total number of Blind Decodings (BDs), a UE is not required to detect all defined DCI formats at the same time. In general, the UE always detects formats 0 and 1A in a USS. Formats 0 and 1A have the same size and are distinguished from each other by a flag in a message. The UE may be required to receive an additional format (e.g., format 1, 1B, or 2 according to a PDSCH Transmission Mode (TM) configured by an eNB). The UE detects formats 1A and 1C in a CSS. The UE may further be configured to detect format 3 or 3A. Formats 3 and 3A have the same size as formats 0 and 1A and may be identified by scrambling a CRC with different IDs (or a common ID), instead of UE-specific IDs.

PDSCH transmission schemes according to TMs and information content of DCI formats are given as follows.

TMs
TM 1: transmission from a single eNB antenna port
TM 2: transmit diversity
TM 3: open-loop spatial multiplexing
TM 4: closed-loop spatial multiplexing
TM 5: Multi-User Multiple Input Multiple Output (MU-MIMO)
TM 6: closed-loop rank-1 precoding
TM 7: single-antenna port (port 5) transmission
TM 8: double-layer transmission (port 7 and port 8) or single-antenna port (port 7 or port 8) transmission
TMs 9 and 10: up to 8-layer transmission (port 7 to port 14) or single-antenna port (port 7 or port 8) transmission DCI Formats
format 0: resource grant for PUSCH transmission
format 1: resource allocation for single-codeword PDSCH transmission (TMs 1, 2 and 7)
format 1A: compact signaling of resource allocation for single-codeword PDSCH (all modes)
format 1B: compact resource allocation for PDSCH (mode 6) using rank-1 closed-loop precoding
format 1C: very compact resource allocation for PDSCH (e.g., paging/broadcast system information)
format 1D: compact resource allocation for PDSCH using MU-MIMO (mode 5)
format 2: resource allocation for PDSCH of closed-loop MIMO operation (mode 4)
format 2A: resource allocation for PDSCH of open-loop MIMO operation (mode 3)
format 3/3A: power control command having 2-bit/1-bit power control value for PUCCH and PUSCH
format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DCI format 2D may be a TM-dedicated DCI format for TM 10. DCI format 1A may be a TM-common DCI format.

Figure 5:
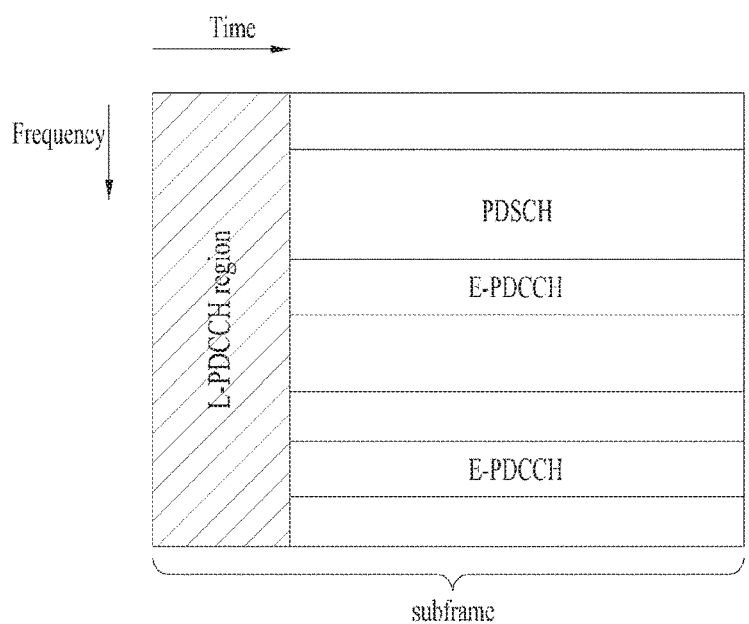
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
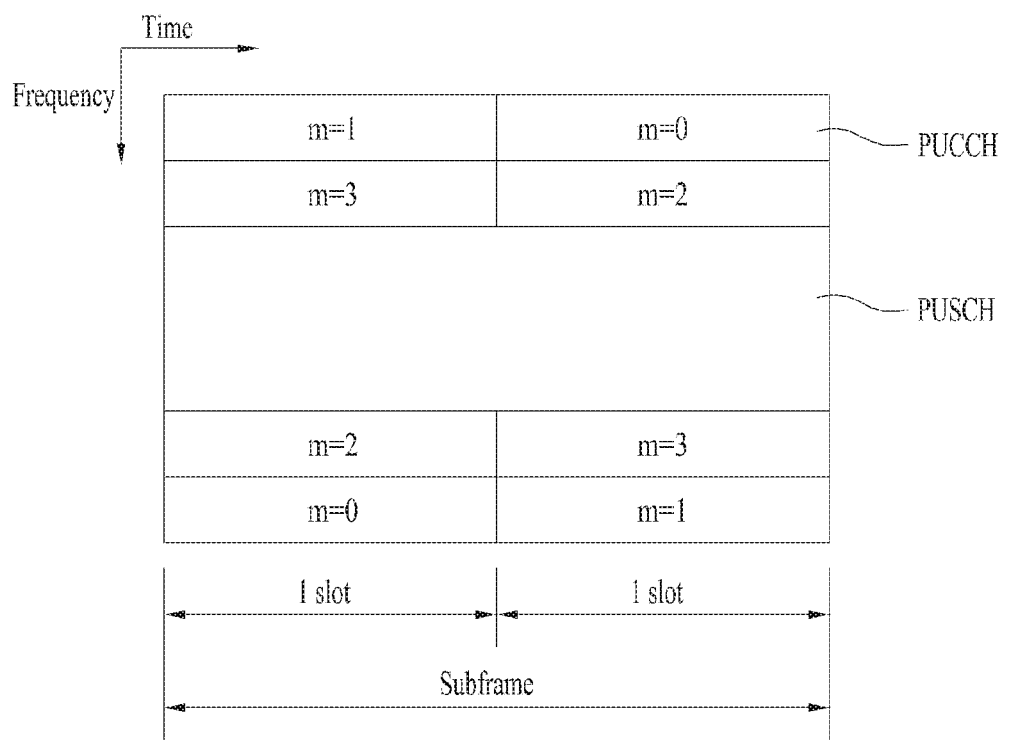
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.

Scheduling Request (SR): information used to request UL-SCH resources. The SR is transmitted in On-Off Keying (OOK).

HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.

Channel Quality Indicator (CSI): feedback information for a DL channel. MIMO-related feedback information includes an RI and a PMI. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

[Table 5] illustrates a mapping relationship between PUCCH formats and UCI in the LTE system.

TABLE 5

| PUCCH format | (Uplink Control Information) UCI |
| --- | --- |
| Format 1 | SR(Scheduling Request) (non-modulated waveform) |
| Format 1a | 1-bit HARQ ACK/NACK (SR present/absent) |
| Format 1b | 2-bit HARQ ACK/NACK (SR present/absent) |
| Format 2 | CQI (20 coded bits) |
| Format 2 | CQI and 1- or 2-bit HARQ ACK/NACK (20 bits) (only in case of extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 7:
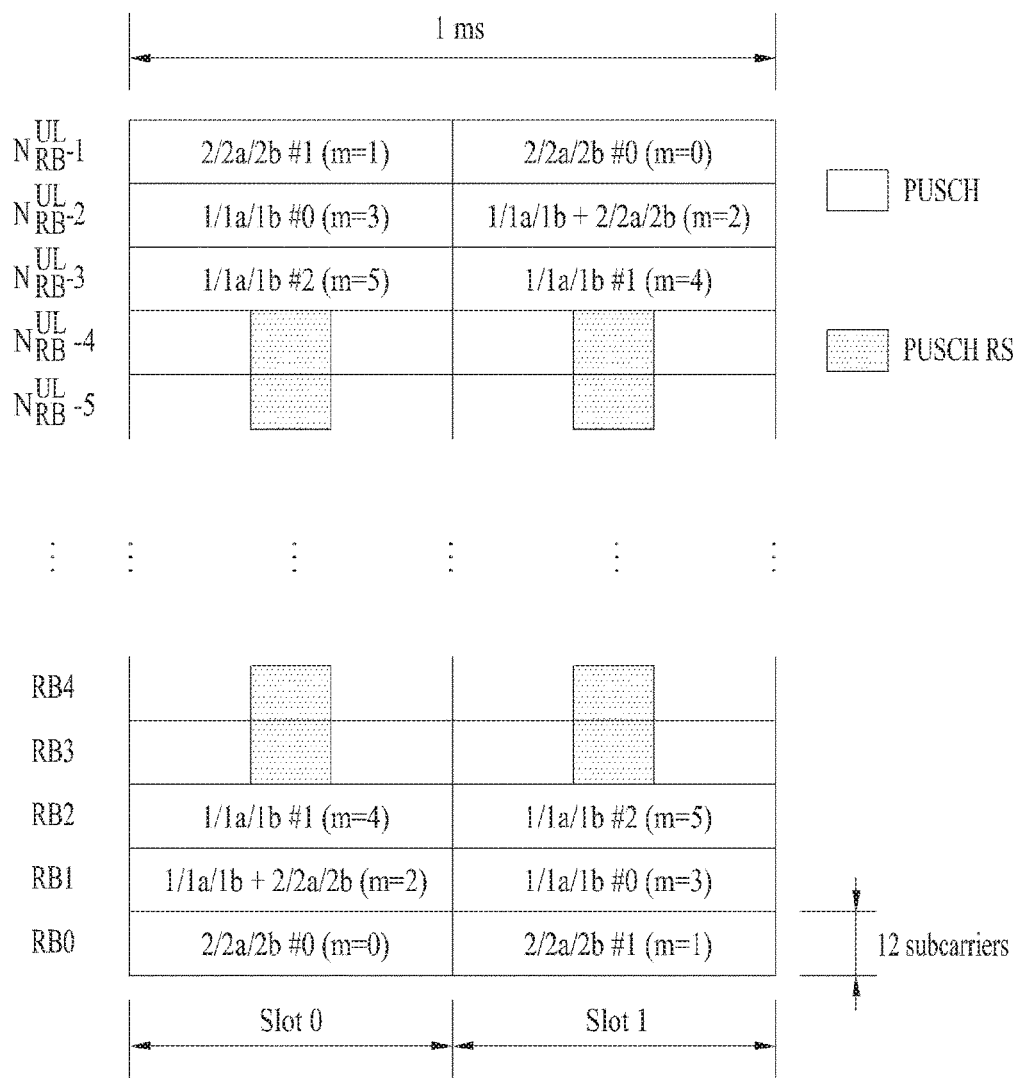
FIG. 7 illustrates an example of physically mapping Physical Uplink Control Channel (PUCCH) formats to a PUCCH region.

FIG. 7 illustrates an example of mapping PUCCH formats to a PUCCH region.

Referring to FIG. 7, PUCCH formats are mapped to RBs in the order of PUCCH format 2/2a/2b (CQI) (e.g. PUCCH region m=0, 1), PUCCH format 2/2a/2b (CQI) or PUCCH format 1/1a/1b (SR/HARQ ACKNACK) (e.g. PUCCH region m=2 if present), and PUCCH format 1/1a/1b (SR/HARQ ACK/NACK) (e.g. PUCCH region m=3, 4, inward starting from a band edge, and transmitted. The number of PUCCH RBs, $N_{RB}^{(2)}$ available for PUCCH format 2/2a/2b (CQI) is indicated to a UE in a cell by broadcast signaling.

Figure 8:
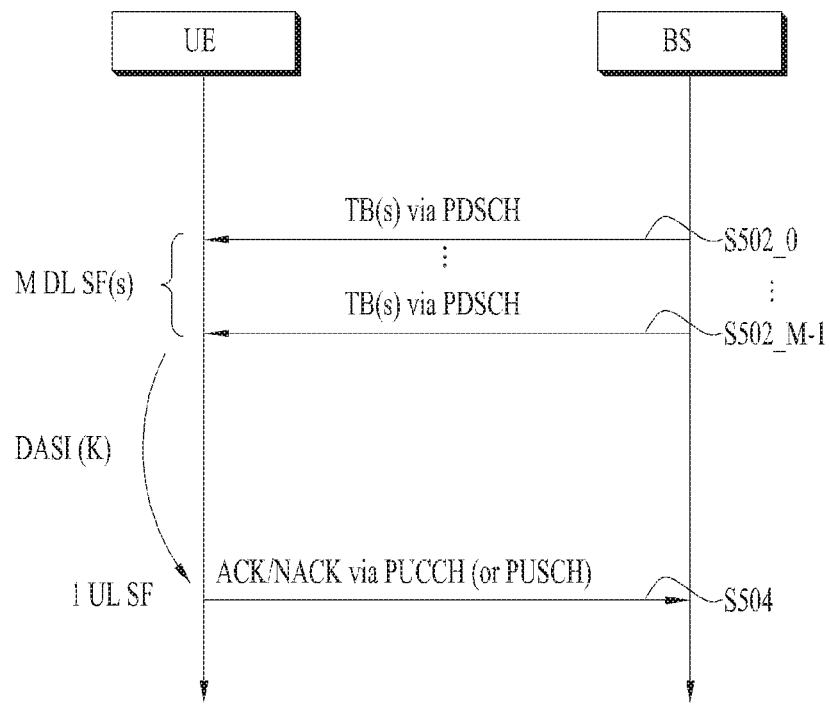
FIG. 8 illustrates an exemplary Hybrid Automatic Repeat reQuest (HARQ) procedure.

FIG. 8 illustrates an exemplary HARQ operation. For the convenience, a case in which a UL ACK/NACK is transmitted in response to DL data (e.g., a PDSCH) in TDD is given as an example.

Referring to FIG. 8, a UE may receive one or more PDSCH signals in M DL Subframes (SFs) (S502_0 to S502_M-1). In FDD, M=1. Each PDSCH signal is transmitted in one or more (e.g., 2) TBs according to a TM. While not shown, a PDCCH signal indicating Semi-Persistent Scheduling (SPS) release may also be received in steps S502_0 to S502_M-1. In the presence of a PDSCH signal and/or an SPS release PDCCH signal in the M DL SFs, the UE transmits an ACK/NACK in one UL SF corresponding to the M DL SFs after an operation for ACK/NACK transmission (e.g., ACK/NACK (payload) generation, ACK/NACK resource allocation, etc.) (S504). The ACK/NACK includes response information to the PDSCH signals and/or the SPS release PDCCH signal received in steps S502_0 to S502_M-1. Although an ACK/NACK is transmitted basically on a PUCCH, if a PUSCH is to be transmitted at a transmission time of the ACK/NACK, the ACK/NACK is transmitted on the PUSCH. Various PUCCH formats listed in [Table 5] may be used for ACK/NACK transmission. To reduce the number of ACK/NACK bits transmitted in a PUCCH format, a method such as ACK/NACK bundling, ACK/NACK channel selection, etc. may be used.

As described before, an ACK/NACK is transmitted in one UL SF in response to data received in M DL SFs in TDD (i.e., M DL SF(s): 1 UL SF). The UL-DL relationship is given by a Downlink Association Set Index (DASI).

[Table 6] lists DASIs (K: $\{k_0, k_1, \ldots k_{M-1}\}$) defined in the LTE(-A) system. [Table 6] illustrates spacings between a UL SF carrying an ACK/NACK and a DL SF linked to the UL SF. Specifically, if a PDSCH and/or a PDCCH indicating SPS release is transmitted in SF (n-k) (k∈K), a UE transmits an ACK/NACK in SF n. In FDD, k=4.

TABLE 6

| TDD UL-DL Config- | Subframe n | | | | | | | | | |
| --- | --- | --- | --- | --- | --- | --- | --- | --- | --- | --- |
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 9:
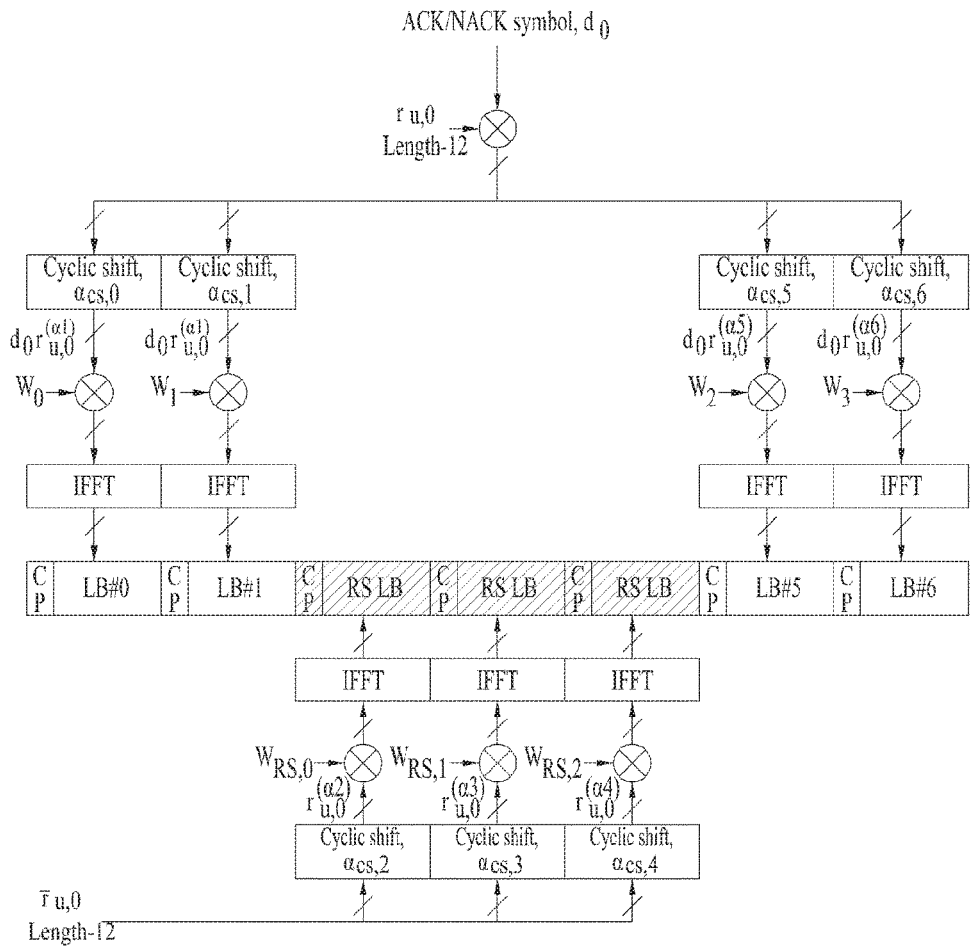
FIG. 9 illustrates a slot-level structure of PUCCH format 1a/1b.

FIG. 9 illustrates a slot-level structure of PUCCH format 1a/1b. PUCCH format 1a/1b is used for ACK./NACK transmission, In the case of normal CP, SC FDMA #2/#3/#4 is used for DM-RS transmission, whereas in the case of extended CP SC-FDMA #2/#3 is used for DM-RS transmission. Accordingly, 4 SC-FDMA symbols are used for ACK-NACK transmission in a slot. For the convenience, PUCCH format 1a/1b is referred to as PUCCH format 1.

Referring to FIG. 9, 1-bit ACK/NACK information [b(0)] and 2-bit ACK/NACK information [b(0)b(1)] are modulated respectively in Binary Phase Shift Keying (BPSK) and QPSK to one ACK/NACK modulation symbol d0. Each bit [b(i), i=0,1] of the ACK/NACK information indicates an HARQ response for a corresponding DL TB. If the bit is 1, it indicates a positive ACK and if the bit is 0, it indicates a Negative ACK (NACK). PUCCH format 1a/1b is cyclically shifted ($\alpha_{cs,x}$) in the frequency domain and spread with an orthogonal spreading code (e.g., a Walsh-Hadamard or a DFT code) $w_0$, $w_1$, $w_2$, and $w_3$ in the time domain. Since code multiplexing is used for PUCCH format 1a/1b in both the time and frequency domains, more UEs may be multiplexed in the same PUCCH RB.

Figure 10:
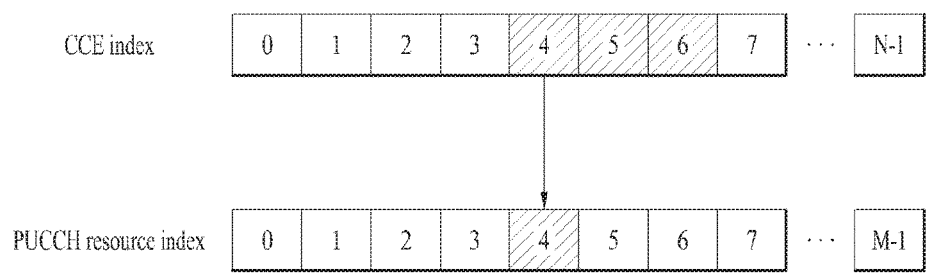
FIG. 10 illustrates an example of determining PUCCH resources for an ACKnowledgment/Negative ACKnowledgment (ACK/NACK)

FIG. 10 illustrates an example of determining PUCCH resources for an ACK/NACK. In the LTE system, PUCCH resources for an ACK/NACK are not pre-allocated to each UE. Rather, a plurality of PUCCH resources are divided for a plurality of UEs at each time point. Specifically, PUCCH resources in which a UE transmits an ACK/NACK are linked to a PDCCH carrying scheduling information for DL data. A whole area carrying PDCCHs in each DL SF includes a plurality of CCEs and a PDCCH transmitted to a UE includes one or more CCEs. The UE transmits an ACK/NACK in PUCCH resources linked to a specific CCE (e.g., the first CCE) among the CCEs of the received PDCCH. For example, if a PDCCH including CCEs #4, #5, and #6 delivers information about a PDSCH as illustrated in FIG. 10, the UE transmits an ACK/NACK on PUCCH #4 corresponding to the first CCE of the PDCCH, CCE #4. FIG. 10 illustrates a case in which up to M PUCCHs exist in a UL Component Carrier (CC), when up to N CCEs exist in a DL CC. Although N may be equal to M, M and N may be set to be different and CCEs may be mapped to PUCCHs in an overlapped manner.

Specifically, PUCCH resource indexes are determined in the LTE system, by the following equation.

$$n^{(1)}_{PUCCH} = n_{CCE} + N^{(1)}_{PUCCH}$$ [Equation 1]

In [Equation 1], $n^{(1)}_{PUCCH}$ represents a resource index of PUCCH format 1a/1b for ACK/NACK/DTX transmission, $N^{(1)}_{PUCCH}$ is a value indicated by higher-layer signaling, and $n_{ccE}$ represents the smallest of CCE indexes used for PDCCH transmission. A cyclic shift, an orthogonal spreading code, and a PRB for PUCCH format 1a/1b are obtained from $n^{(1)}_{PUCCH}$.

Figure 11:
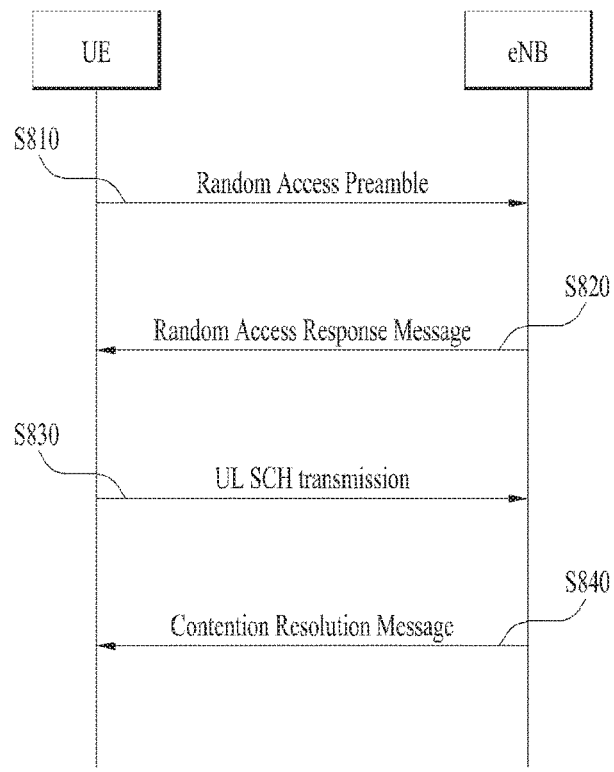
FIG. 11 illustrates a random access procedure.

FIG. 11 illustrates a random access procedure. The random access procedure is used to transmit UL short data. For example, upon occurrence of initial access in Radio Resource Control (RRC) IDLE mode, initial access after Radio Link Failure (RLF), or handover requiring random access, or upon generation of UL/DL data requiring random access in RRC_CONNECTED mode, the random access procedure is performed. The random access procedure is performed in a contention-based manner or a non-contention-based manner.

Referring to FIG. 11, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

Embodiment: Signal Transmission/Processing for MTC (Machine Type Communication)

Configuring low-cost/low-capability UEs focusing on data communication such as metering, water level measurement, surveillance camera utilization, reporting of vending machine stock, etc. are under consideration in a future LTE-A system. These UEs are referred to as an LC UE type (LC-type UEs or LC UEs). Because the LC UE type has a small amount of transmission data and transmits/receives UL/DL data intermittently, it is efficient to reduce the cost and battery consumption of the LC UE type according to its low data rate. Further, the LC UE type is characterized by low mobility and almost no change in a channel environment. Considering that the LC UE type will be deployed in a coverage-limited place such as a building, a factory, a basement, etc., many techniques for enhancing coverage on a channel/signal basis have been proposed. For example, a method for repeatedly transmitting a channel/signal to extend MTC coverage is under discussion.

To implement the low-cost/low-capability features of the LC UE type, reduction of the number of reception antennas, a maximum TB size, a reception buffer size, etc. is under consideration. A reception buffer size may be reduced by reducing a reception frequency area/range (e.g. to a small number of specific RBs). The reception frequency area/range is a frequency area/range that a UE receives, referred to as a reception BandWidth (BW) for the convenience. A reception buffer is used to receive and buffer a signal in the reception BW and a received signal may be buffered during or until before detection/reception/decoding of a related control channel (e.g., a PDCCH).

In this regard, resources (e.g., REs/REGs/CCEs) of a control channel (e.g., a PDCCH, a PCFICH, or a PHICH) are distributed across a total system BW through interleaving. As a result, it may be difficult to reduce a reception BW for the control channel. On the other hand, resources of a data channel (e.g., a PDSCH) may be limited to specific frequency resources (e.g., an RB set) by eNB scheduling. Therefore, a reception buffer size may be reduced by reducing the reception BW of the data channel. For the convenience, the total system BW used for control channel reception is defined as Bc (e.g., N RBs) and a reduced reception BW (i.e., a data (e.g., PDSCH) reception BW) used for reception of a data channel in Bc is defined as Bd (e.g., K RBs).

In view of the nature of MTC applications, the number of LC UE types will increase significantly. Accordingly, it may be significant to efficiently/stably support/control the LC UE types and general UEs (e.g., non-LC-MTC UEs or non-MTC UEs) in consideration of spectral efficiency from the viewpoint of an eNB/cell. For this purpose, configuration/allocation of a different Bd (e.g., RB set) for each LC UE type may be considered. To allow all LC UE types or all UEs (including general UEs) to simultaneously detect/receive specific system common information (e.g., an SIB), the specific system common information may be transmitted only in a specific BW (e.g., a small number of specific RBs at the center of a system BW). Therefore, the transmission resources of the specific system common information and transmission resources of a data channel may be configured to be overlapped wholly or partially or not to be overlapped from the viewpoint of the LC UE types. For the convenience, a reduced reception BW (i.e., a system common information (e.g., SIB) reception BW) used for reception of the specific system common information is defined as Bs (e.g., M RBs). Here, Bs and M may be equal to Bd and K, respectively and the positions of Bs and Bd in Bc may be physically identical or different. For example, Bs and/or Bd may be 1.4 MHz and M and/or K may be 6. Hereinbelow, the reduced reception BW may include both Bd and Bs and may be interpreted as meaning Bd or Bs depending on the context.

Figure 12:
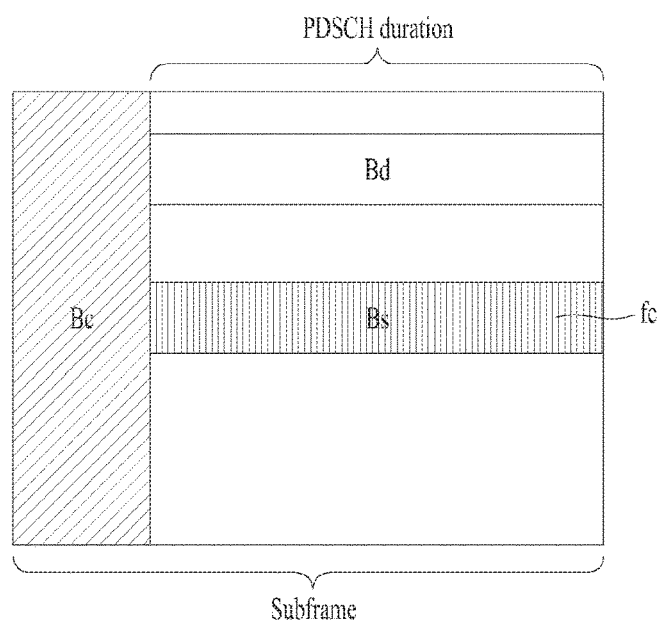
FIG. 12 illustrates an exemplary reduced reception BandWidth (BW) according to the present invention.

FIG. 12 illustrates a system BW (e.g., Bc) and reduced reception BWs (e.g., Bd and Bs). In the example of FIG. 12, N=100, M=K=6, Bs includes 6 RBs located at a cell center (i.e., in a center carrier, fc), and Bd is configured not to be overlapped with Bs. In this case, an LC UE type may receive and buffer data (e.g., a PDSCH) only in a general subframe, whereas the LC UE type switches its reception BW to Bs and receives and buffers data in a subframe scheduled for/carrying specific system common information (e.g., an SIB). A subframe that may be scheduled for an SIB or can carry an SIB (referred to as an "SIB-possible subframe", for the convenience) may be configured separately. Only a normal PDSCH may be transmitted to a specific UE in an SIB-possible SF without carrying an SIB. A legacy UE receives and buffers a signal in a data channel region in a total frequency area during or until before detection/reception/decoding of a control channel (e.g., a PDCCH) that schedules a data channel (e.g., an SIB, a PDSCH, etc.) in each non-Discontinuous Reception (DRX) subframe.

A method for receiving/buffering system common information and a data channel, in consideration of an LC UE type and operating the LC UE type will be described below. In the present disclosure, an LC-MCT UE may be replaced with or generically called an LC UE or an LC type UE.

For the convenience, it is assumed that an SIB-possible SF (information), Bs (i.e., system common information (e.g., an SIB) reception BW), and Bd (i.e., a data (e.g., a PDSCH) reception BW) are pre-configured/pre-allocated. For example, an SIB-possible SF, Bs, and/or Bd may be allocated by RRC signaling. An SF other than an SIB-possible SF is referred to as a normal SF. Normal SFs may be narrowed down to SFs in which a normal PDSCH can be scheduled/transmitted. A normal PDSCH refers to a PDSCH that does not include an SIB and may be narrowed down to a UE-specific PDSCH (e.g., a PDSCH scheduled by a PDCCH carrying a C-RNTI, a TC-RNTI, or an SPS C-RNTI). A data channel period (in the time domain) (e.g., the data region in FIG. 4) determined by PCFICH detection or indicated by RRC signaling is referred to as a PDSCH period. A PDCCH covers both an L-PDCCH and an E-PDCCH and may mean the L-PDCCH and/or the E-PDCCH depending on the context. In cross-SF-scheduling, a PDCCH (DL grant DCI) and a PDSCH corresponding to the PDCCH are transmitted in different SFs. In non-cross-SF-scheduling, a PDCCH (DL grant DCI) and a PDSCH corresponding to the PDCCH are transmitted in the same SF.

Method 1: Normal PDSCH Reception in RB Region Dedicated for SIB (Only in SIB-possible SF)

According to this method, an LC UE type may receive and buffer a signal in a Bd region during a PDSCH period in a normal SF and may receive and buffer a signal in a Bs region during a PDSCH period in an SIB-possible SF. For this purpose, an eNB may schedule/transmit a normal PDSCH for/to an LC UE type only in the Bd region of the normal SF and may schedule/transmit an SIB or a normal PDSCH for/to the LC UE type only in the Bs region of the SIB-possible SF. Accordingly, the LC UE type may operate, assuming/determining that a normal PDSCH is scheduled/transmitted only in a Bd region in a normal SF and only in a Bs region in an SIB-possible SF. Further, the LC UE type may operate, assuming/determining that an SIB is scheduled/transmitted only in the Bs region of the SIB-possible SF.

Method 2: SIB Reception in RB Region Assigned for Normal PDSCH (Even in SIB-possible SF)

According to this method, an LC UE type may receive and buffer a signal only in a Bd region during a PDSCH period in a normal SF and an SIB-possible SF. For this purpose, an eNB may schedule/transmit both a normal PDSCH and an SIB only in the Bd region for/to an LC UE type and the LC UE type may operate, assuming/determining that both a normal PDSCH and an SIB are scheduled/transmitted only in the Bd region. Therefore, an SIB may be scheduled/transmitted on a Bd region basis and/or on a UE group basis (on the basis of a UE group to which the same Bd region is assigned). In this case, an SI-RNTI corresponding to each SIB may be determined differently according to a Bd position in the frequency domain. For example, an SI-RNTI may be determined by a function of a Bd position (e.g., the center frequency of Bd, the starting PRB index of Bd, etc.).

Method 3: Different Reception SF Timings of Normal PDSCH and PDCCH Corresponding to the Normal PDSCH According to this method, an LC UE type may receive/detect an SIB and a PDCCH that schedules the SIB (or a PDSCH transmitted in an SIB-possible SF and a PDCCH that schedules the PDSCH) in the same SF. However, the LC UE type may receive/detect a normal PDSCH and a PDCCH scheduling the normal PDSCH (in total SFs or specific some SFs) (or a PDSCH transmitted in a normal SF and a PDCCH scheduling the PDSCH) in different SFs. For this purpose, an eNB may transmit a normal PDSCH for an LC UE type and a PDCCH scheduling the normal PSCH in different SFs. For example, the normal PDSCH may be transmitted in the closest DL SF after the PDCCH corresponding to the normal PDSCH is transmitted. For example, the PDCCH may be transmitted in DL SF #1 and the normal PDSCH corresponding to the PDCCH may be transmitted in DL SF #2. Therefore, the LC UE type may perform a reception and buffering operation on a Bd region during a PDSCH period in a normal SF and may perform a reception and buffering operation on a Bs or Bd region during a PDSCH period in an SIB-possible SF according to eNB scheduling. In this case, the Bd region or RB resources carrying the normal PDSCH in the normal SF and/or the SIB-possible SF may be indicated directly by the PDCCH scheduling the normal PDSCH.

Specifically, upon detection/receipt of a PDCCH scheduling a normal PDSCH to be transmitted in a SIB-possible SF (e.g., SF #b) (hereinafter, referred to as a normal PDCCH) in an SF (e.g., SF #a) previous to the SIB-possible SF, the LC UE type may operate, assuming/determining that no SIB is scheduled/transmitted in the SIB-possible SF (SF #b). For example, the LC UE type may receive and buffer a signal in a Bd region during a PDSCH period in the SIB-possible SF (e.g., SF #b), without monitoring whether an SIB is scheduled. On the other hand, if the LC UE type has not detected/received a normal PDCCH for the SIB-possible SF (e.g., SF #b), the LC UE type may monitor whether an SIB is scheduled in the SIB-possible SF (SF #b). For example, the LC UE type may receive and buffer a signal in a Bs region during a PDSCH period in an SIB-possible SF and/or operate assuming/determining that a normal PDSCH is exceptionally scheduled by a PDCCH transmitted in the same SIB-possible SF and scheduled/transmitted only in a Bs region. For example, if a normal PDSCH is scheduled in a region other than a Bs region in an SIB-possible SF, a UE may receive the normal PDSCH only in a part overlapped with the Bs region, or may omit normal PDSCH reception. In another method, the LC UE type may operate, assuming/determining that a PDCCH scheduling a normal PDSCH to be transmitted in an SIB-possible SF (e.g., SF #b) is not transmitted/detected in an SF (e.g., SF #a) previous to the SIB-possible SF. For example, the LC UE type may not monitor a normal PDCCH scheduling a normal PDSCH to be transmitted in the SIB-possible SF (SF #b) in the SF (SF #a) previous to the SIB-possible SF. That is, the LC UE type may not perform PDCCH monitoring in SF #a.

PDCCHs that respectively schedule a normal PDSCH to be transmitted in a DL SF (e.g., SF #n) previous to an SIB-possible SF (or a specific normal SF)(e.g., SF #a) and a normal PDSCH to be transmitted in the SIB-possible SF (or the specific normal SF) (SF #a) may be transmitted/detected at the same time (which is supported/allowed) or only one of the PDCCHs may be transmitted/detected selectively (which is assumed for an operation). In this case, the PDCCHs may explicitly or implicitly indicate the SFs (e.g., SF #n and SF #a) carrying the PDSCHs scheduled by the PDCCHs. Also, (i) a PDCCH that schedules an SIB and (ii) a PDCCH that schedules a normal PDSCH to be transmitted in an SF following an SIB-possible SF may be transmitted/detected at the same time (which is supported/allowed) or only one of the PDCCHs may be transmitted/detected selectively (which is assumed for an operation). For example, if only one of the two PDCCHs is selectively transmitted/detected, a UE may monitor only one of a PDCCH having an SI-RNTI and a PDCCH having a C-RNTI. The above-proposed PDSCH scheduling method is applicable commonly to all normal SFs and/or SIB-possible SFs or only to a specific SF (e.g., a DL SF shortly before an SIB-possible SF or one or more specific SFs including this DL SF). Further, it may be generalized that this normal PDSCH scheduling method is applicable to any PDSCH including an SIB.

The above-proposed methods may be limited to an LC UE type to which different Bs and Bd regions are configured/allocated. In other words, these methods may not be applied to an LC UE type to which identical Bs and Bd regions are configured/allocated. In the above-proposed methods, an eNB may omit/quit scheduling/transmission of a normal PDSCH for an LC UE type in an SIB-possible SF. Accordingly, the LC UE type may operate, assuming/determining that a normal PDSCH is not scheduled/transmitted in an SIB-possible SF. For example, the LC UE type may not detect/receive a normal PDSCH transmitted in an SIB-possible SF and a PDCCH scheduling the normal PDSCH.

The afore-described proposed method and operation are not limited to the relationship between a normal PDSCH and an SIB. Rather, they may be applied in the same/similar manner to the relationship between a normal PDSCH and another channel serving a special purpose (e.g., a paging message scheduled based on a P-RNTI in a paging-possible SF in which only a paging message can be present/scheduled and/or a Random Access Response (RAR) scheduled based on an RA-RNTI in an RAR-possible SF in which an RAR can be present/scheduled). In addition, the SIB-possible SF may be generalized to a specific SF (set) predefined or set by an eNB and the proposed method and operation of the present invention are applicable in the same/similar manner based on the generalization.

To enable an LC UE type to reduce/omit an operation for attempting meaningless initial access to a cell (or an eNB) that does not support an operation related to low-cost features (e.g., reduction of the number of reception antennas (e.g., 1 Rx antenna), reduction of a maximum TB size (e.g., up to 1000 bits), reduction of a reception data buffer size (e.g., 6 RBs), etc.), for example, the cell (or eNB) may signal information indicating whether it supports the low-cost features-related operation to the LC UE type by a specific broadcast signal (e.g., using reserved bits of a PBCH (e.g., an MIB) or a specific SIB (e.g., SIB1 or SIB2)). That is, the cell (or eNB) may signal information for controlling initial access of the LC UE type or information for reducing/omitting the initial access of the LC UE type (i.e., information indicating whether the initial access is allowed)(e.g., information indicating whether the low-cost features-related operation is supported) by a specific broadcast signal (e.g., a PBCH (e.g., reserved bits of an MIB) or a specific SIB (e.g., SIB1 or SIB2, particularly SIB1). For reference, conventionally, only network (initial) access barring according to a call/traffic type or a service class is defined and indicated by SIB2. In contrast, network (initial) access may be barred on a UE type basis or for a specific UE type (e.g., an LC UE type) and corresponding information may be transmitted by SIB1, thereby indicating the network (initial) access barring more rapidly than the conventional network access control information in the present invention. Consequently, the power/latency of the specific UE type (e.g., the LC UE type) in network (initial) access may be minimized. From the viewpoint of a UE, SIBx is received in an ascending order of x values.

Figure 13:
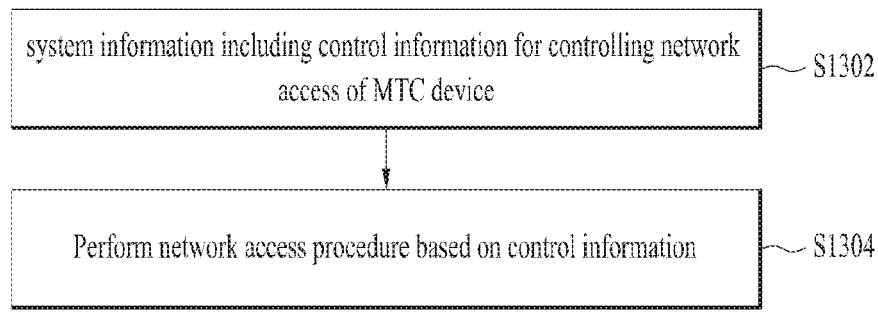
FIG. 13 illustrates an exemplary network access procedure according to the present invention.

FIG. 13 illustrates an exemplary network access procedure according to the present invention. Referring to FIG. 13, a UE may receive from an eNB (or cell) system information including control information for controlling network (initial) access of an MTC device (S1302). Then, the UE may perform a network (initial) access procedure to the eNB (or cell) (S1304). If the control information allows network access or the UE is a non-LC UE type, the UE may perform a random access procedure in the network (initial) access procedure (e.g., see FIG. 11). On the other hand, if the control information does not allow network (initial) access and the UE is an LC UE type, the UE may skip or delay the random access procedure by a predetermined time in the network (initial) access procedure. Specifically, if the control information does not allow network (initial) access and the UE is an LC UE type, the UE may not camp on the eNB (or cell), considering that the eNB (or cell) is a barred eNB (or cell). Camp-on means that a UE is allowed to use a control channel by tuning to a center frequency of an eNB (or cell). Accordingly, the UE may receive control information such as a paging message, system information, etc. from the camped-on cell. In addition, the UE may perform the random access procedure or request an RRC connection to the eNB. If the UE does not perform cell reselection on a barred eNB (or cell), the UE reselects another eNB (or cell) satisfying a cell reselection condition. Depending on implementation, the eNB (or cell) may be regarded as barred only for a predetermined time, and the UE may exclude the eNB (or cell) from candidate eNBs (or cells) for cell reselection only for the predetermined time. Here, the control information may include information indicating whether an MTC device is allowed for network access or information for reducing or omitting network access of an MTC device. Or the control information may include information indicating whether the eNB supports an MTC function. The system information including the control information may include an SIB. Also, the system information including the control information may include an MIB and the control information may be received in reserved bits of the MIB.

Configuration of HARQ-ACK Feedback Corresponding to PDSCH Scheduling for LC UE Type An LC UE type may include only one reception antenna, for implementation as a low-cost device. In this case, PDSCH scheduling may also be limited to rank 1 and/or one layer. In a specific DL TM (e.g., TM 3 with DCI format 2A, TM 4 with DCI format 2, TM 8 with DCI format 2B, TM 9 with DCI format 2C, or TM 10 with DCI format 2D), it is regulated that up to 2 TBs or CWs are transmitted on one PDSCH. Even though a specific DL TM is configured for a LC UE type, the LC UE type may be scheduled for/receive only one TB/CW due to the limitation on the transmission rank/the number of layers imposed by the presence of a single reception antenna.

Thus, it is proposed that even though a specific DL TM (e.g., TM 3/4/8/9/10) capable of/supporting transmission of up to 2 TBs/CWs, an LC UE type operates, assuming/determining that only one TB/CW is always scheduled/received in one SF or on one PDSCH. Accordingly, the LC UE type set to the specific DL TM may configure/transmit only a 1-bit HARQ-ACK feedback for a single TB/CW in (BPSK-based) PUCCH format 1a. When the HARQ-ACK is piggybacked to a PUSCH, the LC UE type may also configure/transmit a 1-bit HARQ-ACK per DL SF. For the LC UE type, information about a first TB/CW may be always scheduled and information about a second TB/CW (e.g., an MCS field and/or an HARQ process number field) may be set to a predefined value (e.g., 0 or 1) in a specific DCI format (e.g., 2A/2/2B/2C/2D) capable of/supporting scheduling of up to 2 TBs/CWs. In this case, the predefined value for the second TB/CW may be used for error check.

In another method, an HARQ-ACK response (e.g., an ACK or NACK) to a scheduled/received single TB/CW may be mapped equally to HARQ-ACK bits for 2 TBs/CWs and the 2-bit HARQ-ACK feedback for the 2 TBs/CWs may be configured/transmitted in (QPSK-based) PUCCH format 1b. Similarly, when an HARQ-ACK is piggybacked to a PUSCH, a 2-bit HARQ-ACK per DL SF may be configured/transmitted and mapped to the same value as an HARQ-ACK (e.g., an ACK or NACK) for a scheduled/received single TB/CW.

Configuration of Data Reception RB Region (i.e., Bd) Based on Previous DCI

It may be contemplated as another scheduling method for an LC UE type that a PDSCH signal reception/buffering RB region (i.e., Bd) is configured in an SF (e.g., SF #(n+k), k>0) following SF #n based on DCI scheduling PDSCH transmission in SF #n (based on RB resources allocated by the DCI). For the convenience, DCI scheduling a PDSCH in SF #n, (transmitted in SF #n) is referred to as "previous DCI", and DCI scheduling a PDSCH in SF #(n+k), (transmitted in SF #(n+k)) is referred to as "current DCI". It is assumed that the maximum number of RBs available for DL data reception at a LC UE type is limited to L. L may be fixed or changed in units of an SF within a predetermined range based on the previous DCI. The positions of L RBs may be changed in units of an SF based on the previous DCI.

Specifically, the LC UE type may determine a reception/buffering RB region (Bd), that is, L RBs for a PDSCH signal scheduled by the current DCI with respect to RBs allocated by the previous DCI. Therefore, the LC UE type may operate, assuming/determining that the PDSCH based on the current DCI is scheduled to be transmitted in all or a part of the L RBs. Therefore, if the RBs allocated by the current DCI (e.g., DCI #a in SF #(n+k)) do not belong to the L-RB resource region, the LC UE may not receive/detect a PDSCH in SF #(n+k) and then may reconfigure a PDSCH signal reception/buffering RB region (i.e., L RBs) in an SF following SF #(n+k) (e.g., SF #(n+k+k1), k1>0), considering the current DCI (e.g., DCI #a in SF #(n+k)) to be new previous DCI.

Or, if RB resources allocated by current DCI (e.g., DCI #a in SF #(n+k)) are overlapped partially with L RBs (e.g., with at least one or a predetermined number of RBs out of the L RBs), the LC UE type may receive a PDSCH signal only in the overlapped area. For this purpose, the eNB may transmit a PDSCH signal by puncturing or rate-matching a non-overlapped area, and the LC UE type may exclude the non-overlapped area, taking into account only the overlapped area during PDSCH reception. If the RB resources allocated by the current DCI (e.g., DCI #a in SF #(n+k)) are not overlapped with the L RBs, the LC UE type may reconfigure a PDSCH signal/buffering RB region (i.e., L RBs) in an SF (e.g., SF #(n+k+k1), k1>0) following SF #(n+k), determining the current DCI (e.g., DCI #a in SF #(n+k)) to be new previous DCI without PDSCH reception/detection in SF #(n+k).

The proposed method is applicable in a similar manner to a method for determining L or fewer RBs in which an actual PDSCH is scheduled/transmitted among RB resources allocated by DL grant DCI, when a PDSCH signal reception/buffering RB region (i.e., Bd) is semi-statically configured in a non-cross-SF scheduling situation. The PDSCH signal reception/buffering RB region may be configured semi-statically by, for example, higher-layer signaling (e.g., RRC signaling).

On the assumption that the number of RBs allocated by previous DCI is M and the index of a specific RB (e.g., the smallest RB index) among the M RBs is m, a PDSCH signal reception/buffering region corresponding to current DCI may be configured as follows. The following method may be applied to, not limited to, scheduling/transmission of a specific UE-common PDSCH (e.g., a (specific) SIB). L may be fixed or semi-statically configured by higher-layer signaling (e.g., RRC signaling).

Case #1) M=L

Alt 1) L reception RB resources are configured to be identical to M ∄ RB resources.

Alt 2) set i) m~m+L−1, ii) m−L+1~m, iii) m−(L−1)/2~m+(L−1)/2 (L: odd number), or iv) m−L/2~m+L/2−1 or m−L/2+1~m+L/2 (L: even number) as the indexes of the L reception RB resources.

Case #2) M<L

Alt 1) L reception RB resources include M RB resources, and the remaining (L−M) RB resources needed for the L reception RBs are configured to be i) an RB resource adjacent to the smallest RB index of the M RBs and having a smaller index, ii) an RB resource adjacent to the largest RB index of the M RBs and having a larger index, or iii) (a set of) an RB resource adjacent to the smallest RB index of the M RBs and having a smaller index, and/or an RB resource adjacent to the largest RB index of the M RBs and having a larger index.

Alt 2) i) set m~m+L−1, ii) m−L+1~m, iii) m−(L−1)/2~m+(L−1)/2 (L: odd number), or iv) m−L/2~m+L/2−1 or m−L/2+1~m+L/2 (L: even number) as the indexes of L reception RB resources.

Alt 3) set only M resources as reception RB resources.

Case #3) M>L

Alt 1) L reception resources are configured to be, among M RB resources, i) RB resources corresponding to L smallest indexes, ii) RB resources corresponding to L largest indexes, or iii) RB resources corresponding to the remaining L RB indexes (e.g., L RB indexes at the center of indexes) except for (a set of) one or more smallest indexes and/or one or more largest indexes.

Alt 2) i) set m~m+L−1, ii) m−L+1~m, iii) m−(L−1)/2~m+(L−1)/2 (L: odd number), or iv) m−L/2~m+L/2−1 or m−L/2+1~m+L/2 (L: even number) as the indexes of L reception RB resources.

Alt 3) an L-RB resource region for reception of a later-scheduled PDSCH is reconfigured, considering current DCI to be new previous DCI without configuring reception RB resources (i.e., without PDSCH reception/detection in SF #(n+k)).

The proposed methods (e.g., Alt 1 of Case #1, Alt 3 of Case #2, and Alt 1 of Case 3#) may be applied in a similar manner to a method for determining L or fewer RBs in which an actual PDSCH is scheduled/transmitted among RB resources allocated by DL grant DCI in a cross-SF scheduling situation.

HARQ-ACK Feedback Transmission for Cross-SF Scheduling

If cross-SF scheduling is used (see Method 3), an SF timing for transmitting an HARQ-ACK (hereinafter, referred to as an A/N) feedback in response to a PDSCH and a method for allocating resources for transmitting the HARQ-ACK feedback may need to be defined. For the convenience, it is assumed that a DL grant PDCCH is transmitted in SF #n and a PDSCH is transmitted in SF #(n+k) (k>0 (e.g., k=1)) in a cross-SF scheduling situation. An A/N transmission timing may be defined as a UL SF timing linked to the SF in which the PDSCH is received (taking into account a time taken for PDSCH decoding) in the cross-SF scheduling situation. For example, if a PDSCH is received in SF #n, an A/N may be transmitted in SF #(n+d) in response to the PDSCH. In FDD, d=4 and in TDD, d may be given as illustrated in Table 6.

PUCCH resources for A/N transmission may be allocated in the following methods.

Option 1) Implicit PUCCH Stacking after Legacy PUCCH Region

A/N transmission resources are basically determined based on the legacy relationship between PDCCH CCE resource indexes and PUCCH resource indexes (see [Equation] 1). PUCCH resources for cross-SF scheduling may be stacked after legacy PUCCH resources (or a legacy PUCCH region) reserved for non-cross SF scheduling. For example, (legacy) PUCCH resources linked to a CCE index of SF #(n+k) may be first reserved in SF #(n+k+d) and then (cross-SF scheduling-based) PUCCH resources linked to a CCE index of SF #n may be additionally stacked (e.g., the legacy PUCCH and the cross-SF-based PUCCH are sequentially stacked inward starting from the outer edge of a UL band). For example, PUCCH resource indexes may be determined in SF #(n+k+d), as follows.

$$n^{(1)}_{PUCCH}=n_{CCE}+N^{(1)}_{PUCCH} \text{ [For non-cross-SF scheduling]}$$

$$n^{(1)}_{PUCCH}=n_{CCE}+N^{(1)}_{PUCCH}+N\_last \text{ [For cross-SF scheduling]} \quad \text{[Equation 2]}$$

where $n^{(1)}_{PUCCH}$ represents a resource index of PUCCH format 1a/1b for ACK/NACK/DTX transmission, $N^{(1)}_{PUCCH}$ is a value indicated by higher-layer signaling (e.g., RRC signaling), and $n_{CCE}$ represents a specific CCE index (e.g., the smallest CCE index) used for PDCCH transmission. N_last represents the last index or the number of legacy PUCCH resources reserved in SF #(n+k+d). N_last may be set on the assumption of a maximum CFI value (or the maximum number of CCE resources) configurable in SF #(n+k).

Option 2) Implicit PUCCH Stacking by Applying PUCCH Starting Offset

Basically, A/N transmission resources are determined using the legacy relationship between PDCCH CCE resource indexes and PUCCH resource indexes (see [Equation 1]). In cross-SF scheduling, final PUCCH resources may be determined by applying a starting offset for PUCCH resource indexes to legacy PUCCH resource indexes. For example, PUCCH resource indexes in SF #(n+k+d) may be determined as follows.

$$n^{(1)}_{PUCCH}=n_{CCE}+N^{(1)}_{PUCCH} \text{ [For non-cross-SF scheduling]}$$

$$n^{(1)}_{PUCCH}=n_{CCE}+N^{(1)}_{PUCCH}+N\_pucch \text{ [For cross-SF scheduling]} \quad \text{[수학식 3]}$$

where $n^{(1)}_{PUCCH}$ represents a resource index of PUCCH format 1a/1b for ACK/NACK/DTX transmission, $N^{(1)}_{PUCCH}$ is a value indicated by higher-layer signaling (e.g., RRC signaling), and $n_{CCE}$ represents a specific CCE index (e.g., the smallest CCE index) used for PDCCH transmission. N_pucch represents a starting offset for PUCCH resource indexes, which may be signaled/configured by an SIB or RAR.

Option 3) Implicit PUCCH Stacking Based on Linkage with PDSCH PRB Index

Compared to a legacy method (e.g., CCE-to-PUCCH linkage), with a relationship between PRB indexes used for PDSCH transmission and PUCCH resource indexes pre-defined/preset, (implicit) PUCCH resource indexes linked to a specific PRB index (e.g., the first PRB index) of a cross-SF scheduled PDSCH may be determined as A/N transmission resources for a PDSCH. In non-cross SF scheduling, PUCCH resources for A/N transmission may be determined using a basic method (e.g., [Equation 1]).

Similarly to the foregoing case, i) PUCCH resources linked to a PDSCH PRB index in SF #(n+k) may be stacked after a reserved area for legacy PUCCH resources linked to a CCE index of SF #(n+k) or ii) final A/N transmission resources may be determined by applying a PUCCH resource index starting offset (e.g., N_pucch) to a PUCCH index linked to a specific PRB index (e.g., the first PRB index).

Option 4) Explicit PUCCH Configuration using A/N Resource Indicator

With a plurality of PUCCH resources preconfigured (by higher-layer signaling such as RRC signaling), a PUCCH resource for an HARQ-ACK for DL data among the plurality of PUCCH resources may be indicated by DL grant DCI, based on resources carrying DCI (e.g., a CCE index used for PDCCH transmission), or based on resources allocated for transmission of DL data corresponding to DCI (e.g., a PRB index used for PDSCH transmission). The HARQ-ACK transmission resources may be indicated by DL grant DCI, for example, by adding a new field to the DCI or borrowing/referring to a specific existing field of the DCI (e.g., a TPC field or a HARQ process number field).

In TDD, an A/N is transmitted in one UL SF in response to reception of a PDSCH in DL SF(s). A DL SF set linked to one UL SF is defined as a "bundling window", for the convenience. In TDD, if a PDSCH corresponding to a DL grant PDCCH is transmitted in the same bundling window, existing (legacy) implicit PUCCH linkage is still used. If a PDCCH and a PDSCH are transmitted in different bundling windows, A/N resources may be determined using one of the proposed methods.

To avoid introduction of additional PUCCH resource stacking or application of a PUCCH starting offset, transmission of a DL grant PDCCH for cross-SF scheduling and a PDSCH corresponding to the DL grant PDCCH may be limited to the same bundling window. Equivalently, a UE may operate, assuming/determining that a PDCCH and a PDSCH are not transmitted in different bundling windows. For example, if a PDCCH and a PDSCH are transmitted in different bundling windows, PDCCH monitoring and/or PDSCH decoding may be omitted.

If a DL grant PDCCH is received/detected successfully with a PDSCH transmission/reception SF timing (hereinafter, referred to as PDSCH_start_SF) preset, a PDSCH corresponding to (i.e., scheduled by) the PDCCH may be transmitted/received in the closest PDSCH_start_SF after an SF in which the PDCCH is transmitted/detected. Similarly, (with an SF timing (hereinafter, referred to as PUCCH_start_SF) for transmission of a PUCCH for an HARQ-ACK feedback preset), an HARQ-ACK PUCCH may be transmitted in the closest PUCCH_start_SF after an SF carrying the PDSCH (or including an SF timing obtained by adding a specific SF offset to the SF carrying the PDSCH), in response to the reception of the PDSCH.

A TPC command signaled by a DL grant PDCCH may be applied to PUCCH transmission (power control) in SF #(n+k+d) carrying an A/N in response to a PDSCH scheduled by the PDCCH, instead of SF #(n+d) linked to SF #n carrying the PDCCH.

If cross-SF scheduling is used, an A/N for a PDCCH (SF #n) commanding/indicating DL SPS release 1) may be transmitted exceptionally in SF #(n+d) as is done conventionally, or 2) may be transmitted in SF #(n+k+d) to match a PDCCH-to-A/N delay. In the case of 1), legacy implicit PUCCH resources may be allocated, whereas in the case of 2), PUCCH resources may be allocated according to the above proposed method.

Cross-SF scheduling of a PDSCH (SF #(n+k)) by a PDCCH (SF #n) indicating DL SPS activation may be considered. In this case, the starting point of an SPS PDSCH transmission period may be set to a reception timing (SF #(n+k)) of a PDSCH scheduled by the PDCCH indicating DL SPS activation, not a reception timing (SF #n) of the PDCCH. That is, an SPS PDSCH may be transmitted with a predetermined period with respect to/starting from the reception timing of a PDSCH.

In another method, if the SPS PDSCH transmission period is N SFs, a PDSCH scheduled by a PDCCH (SF #n) indicating DL SPS activation may be transmitted in SF #(n+N) (in the case of cross-SF scheduling or irrespective of cross-SF scheduling). Or, a reception/buffering RB region for an SPS PDCCH may be configured independently of a reception/buffering RB region for a normal PDSCH by higher-layer signaling such as RRC signaling (in the case of cross-SF scheduling or irrespective of cross-SF scheduling).

If cross-SF scheduling is not used (e.g., if with a PDSCH signal reception/buffering RB region configured semi-statically by higher-layer signaling, a PDCCH and a PDSCH scheduled by the PDCCH are transmitted in the same SF), misalignment/ambiguity and malfunction regarding the RB region may occur between a UE and an eNB during reconfiguration of the PDSCH RB region (e.g., RRC reconfiguration).

Considering the misalignment/ambiguity and the malfunction, an RB region (B_css) for receiving/buffering a unicast PDSCH signal scheduled by a CSS and an RB region (B_uss) for receiving/buffering a unicast PDSCH signal scheduled by a USS may be configured independently. For example, an SF that may be scheduled for a unicast PDSCH by a CSS and an SF that may be scheduled for a unicast PDSCH by a USS may be configured exclusively in TDM. In other words, an SF in which a unicast PDSCH may be scheduled through a B_css region and an SF in which a unicast PDSCH may be scheduled through a B_uss region may be exclusively configured in TDM. The unicast PDSCH signal may be scheduled using, for example, a C-RNTI-based PDCCH.

It may be further generalized that an RB region (B_css) for receiving/buffering a PDSCH signal scheduled by a CSS and an RB region (B_uss) for receiving/buffering a PDSCH signal scheduled by a USS may be configured independently. For example, an SF that may be scheduled for a PDSCH by a CSS and an SF that may be scheduled for a PDSCH by a USS may be configured exclusively in TDM. In other words, an SF in which any PDSCH may be scheduled through a B_css region and an SF in which any PDSCH may be scheduled through a B_uss region may be exclusively configured in TDM. The PDSCH signal includes a unicast PDSCH and/or a multicast/broadcast PDSCH.

In another method, an RB region (hereinafter, referred to as B_fix) for which PDSCH scheduling accompanying parameter reconfiguration (e.g., RRC reconfiguration) is considered and an RB region (hereinafter, referred to as B_cfg) for which normal PDSCH scheduling for a purpose other than reconfiguration (based on flexible frequency resource change/configuration) is considered may be configured independently without a distinction between SSs. In this case, an SF scheduled for transmission of a unicast PDSCH (scheduled using a C-RNTI-based PDCCH) in the B_fix region and an SF scheduled for transmission of a unicast PDSCH in the B_cfg region may be configured exclusively in TDM.

Or it may be generalized that with an RB region (B_fix) and an RB region (B_cfg) configured independently, an SF scheduled for transmission of any PDSCH in the B_fix region and an SF scheduled for transmission of any PDSCH in the B_cfg region may be exclusively configured in TDM.

Figure 14:
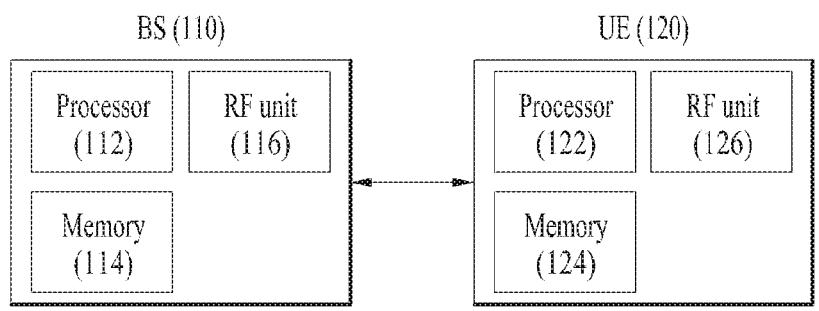
FIG. 14 is a block diagram of a Base Station (BS) and a User Equipment (UE) according to an embodiment of the present invention.

FIG. 14 is a block diagram of a BS and a UE which are applicable to an embodiment of the present invention.

Referring to FIG. 14, a wireless communication system includes a BS 110 and a UE 120. A transmitter is a part of the BS 110 and a receiver is a part of the UE 120 on DL. A transmitter is a part of the UE 120 and a receiver is a part of the BS 110 on UL. The BS 110 includes a processor 112, a memory 114, and a Radio Frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term fixed station, Node B, evolved Node B (eNode B or eNB), Access Point (AP), etc. The term 'terminal' may be replaced with the term UE, Mobile Station (MS), Mobile Subscriber Station (MSS), Subscriber Station (SS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a method and apparatus for performing communication, when MTC is supported in a wireless communication system.

What is claimed is:

1. A method for controlling network access by a User Equipment (UE) in a wireless communication system, the method comprising:
   receiving system information related with network access of a specific type device from a Base Station (BS), wherein the specific type device supports a transport block size of up to 1000-bits and has only a single receipt antenna;
   if the system information allows network access of the specific type device or the UE is not the specific type device, performing a random access procedure for network initial access as to the BS and a procedure for receiving downlink data; and
   if the system information does not allow network access of the specific type device and the UE is the specific type device, skipping the random access procedure for network initial access as to the BS,
   wherein the procedure for receiving the downlink data includes:
      receiving a first Physical Downlink Control Channel (PDCCH) including control information indicating a first set of Resource Blocks (RBs) corresponding to a current downlink signal reception frequency region for the UE at a subframe #n, wherein n is a non-negative integer,
      receiving a second PDCCH including control information indicating a second set of RBs allocated for Physical Downlink Shared Channel (PDSCH) at a subframe #n+k, wherein k is a positive integer,
      when there is a partial overlap region between the first set of RBs and the second set of RBs, receiving the PDSCH through only the partial overlap region at the subframe #n+k, and
      when there is not any overlap region between the first set of RBs and the second set of RBs, skipping a detection procedure for receiving the PDSCH at the subframe #n+k, and setting the second set of RBs as a next downlink signal reception frequency region for the UE at a subframe after the subframe #n+k.

2. The method according to claim 1, wherein the system information includes information indicating whether the BS supports functions related with the specific type device.

3. The method according to claim 1, wherein the system information includes a System Information Block1 (SIB1).

4. The method according to claim 1, wherein the system information includes a Master Information Block (MIB) and the control information indicating the network access control of the specific type device is received in a reserved bit of the MIB.

5. A User Equipment (UE) in a wireless communication system, the UE comprising:
   a Radio Frequency (RF) unit; and
   a processor,
   wherein the processor is configured to:
      receive system information related with network access of a specific type device from a Base Station (BS), wherein the specific type device supports a transport block size of up to 1000-bits and has only a single receipt antenna,
      if the system information allows network access of the specific type device or the UE is not the specific type device, perform a random access procedure for network initial access to the BS and a procedure for receiving downlink data, and
      if the system information does not allow access of the specific type device and the UE is the specific type device, skip the random access procedure for network initial access to the BS,
wherein the procedure for receiving the downlink data includes:
  receiving a first Physical Downlink Control Channel (PDCCH) including control information indicating a first set of Resource Blocks (RBs) corresponding to a current downlink signal reception frequency region for the UE at a subframe #n, wherein n is a non-negative integer,
  receiving a second PDCCH including control information indicating a second set of RBs allocated for Physical Downlink Shared Channel (PDSCH) at a subframe #n+k, wherein k is a positive integer,
  when there is a partial overlap region between the first set of RBs and the second set of RBs, receiving the PDSCH through only the partial overlap region at the subframe #n+k, and
  when there is not any overlap region between the first set of RBs and the second set of RBs, skipping a detection procedure for receiving the PDSCH at the subframe #n+k, and setting the second set of RBs as a next downlink signal reception frequency region for the UE at a subframe after the subframe #n+k.

6. The UE according to claim 5, wherein the system information includes information indicating whether the BS supports functions related with the specific type device.

7. The UE according to claim 5, wherein the system information includes a System Information Block1 (SIB1).

8. The UE according to claim 5, wherein the system information includes a Master Information Block (MIB) and the control information indicating the network access control of the specific type device is received in a reserved bit of the MIB.

* * * * *